No. 806,804. PATENTED DEC. 12, 1905.
W. E. HAMILTON.
LOADING MACHINE.
APPLICATION FILED AUG. 31, 1904.

WITNESSES:
J. B. Mejourn,
Fred F. Reisner

INVENTOR.
W. E. Hamilton,
BY Carr & Carr,
ATTORNEYS.

Fig. 2.

No. 806,804. PATENTED DEC. 12, 1905.
W. E. HAMILTON.
LOADING MACHINE.
APPLICATION FILED AUG. 31, 1904.

WITNESSES:  INVENTOR.
W. E. Hamilton,
BY
ATTORNEYS

No. 806,804. PATENTED DEC. 12, 1905.
W. E. HAMILTON.
LOADING MACHINE.
APPLICATION FILED AUG. 31, 1904.

WITNESSES:
J. B. Megown
Fred F. Reeves

INVENTOR:
W. E. Hamilton,
BY
ATTORNEYS.

No. 806,804. PATENTED DEC. 12, 1905.
W. E. HAMILTON.
LOADING MACHINE.
APPLICATION FILED AUG. 31, 1904.

WITNESSES:
Fred P. Reiner
J. B. Megoun

INVENTOR,
W. E. Hamilton,
BY Carr & Carr
ATTORNEYS.

No. 806,804. PATENTED DEC. 12, 1905.
W. E. HAMILTON.
LOADING MACHINE.
APPLICATION FILED AUG. 31, 1904.

WITNESSES:
Fred F. Reisner
J. B. Megown

INVENTOR,
W. E. Hamilton,
BY
ATTORNEYS.

UNITED STATES PATENT OFFICE.

WILLIAM E. HAMILTON, OF COLUMBUS, OHIO, ASSIGNOR TO THE HAMILTON MANUFACTURING COMPANY, OF COLUMBUS, OHIO, A CORPORATION OF OHIO.

LOADING-MACHINE.

No. 806,804.     Specification of Letters Patent.     Patented Dec. 12, 1905.

Application filed August 31, 1904. Serial No. 222,846.

*To all whom it may concern:*

Be it known that I, WILLIAM E. HAMILTON, a citizen of the United States, and a resident of the city of Columbus, county of Franklin, and State of Ohio, have invented a new and useful Improvement in Loading-Machines, of which the following is a specification.

My invention relates to loading-machines, and has for its principal objects to improve the construction of loading-machines so that they may be used in mines having very low veins, to provide a gathering mechanism capable of gathering material to be loaded when sweeping either to right or left of the machine, to provide a gathering member provided with means to loosen the material to be loaded, to provide means to gather scattered portions of the material to be loaded and direct it to the gathering member, to provide pneumatically-operated feed mechanism mounted upon the forward end of the gathering mechanism, to provide a movable rail-engaging truck-stay, to provide a removable truck for a loading-machine to support the forward end of the gathering mechanism when the machine is to be moved from place to place, to provide an adjustable picking-table support, to provide a picking-table having limited universal movement about a point in the head-shaft, to drive the flight-chain of the picking-table by a universally-mounted sprocket on the head-shaft, to automatically drive the cars back by the action of the flights of the picking-table as the cars are filled, and other objects hereinafter more fully appearing.

My invention consists in the parts and in the arrangements and combinations of parts hereinafter described and claimed.

In the accompanying drawings, forming a part of this specification, and wherein like symbols refer to like parts wherever they occur.

The loading-machine is mounted upon a self-propelling or locomotive truck 1, so that it is capable of moving itself from place to place. A motor 2 of any suitable type is mounted on the truck and is connected through suitable gearing with a shaft 3, upon which a sprocket-wheel 4 is fixed. A sprocket-wheel 5 is fixed upon the rear axle of the truck and is connected with the first-mentioned sprocket-wheel 4 by means of a sprocket-chain 6. The details of the transmission from the motor to the shaft 3 are shown and described in Patent No. 765,833, issued to me July 26, 1904.

A base-plate 7 is secured upon the truck-frame and is provided with a step-bearing 8. A bracket 10 extends upwardly from the truck-frame at one side of the picking-table and is provided with a vertical bearing 10'. The step-bearing 8 and vertical bearing 10' are in vertical alinement, and a vertical shaft 9, hereinafter referred to as the "head-shaft," is journaled therein.

The loading-machine comprises two conveyers, a primary conveyer 11 and a secondary conveyer 12, hereinafter referred to as the "picking-table," both of which are actuated by the head-shaft 9. At its top the head-shaft has a spherical enlargement or ball 13, from which pins 14 project radially. A combined sprocket and bearing 15 is mounted on the ball 13, being provided with a corresponding spherical recess. Equatorial slots 16 are provided to receive the pins 14, a roller 17 being interposed between each pin and the walls of its respective slot. The details of this joint and transmission are shown and described in my Patent No. 740,559, issued to me October 6, 1903. The frame of the initial conveyer 11 has a collar 19, which is seated in a groove in the lower end of the sprocket-hub, by means of which the frame is supported. Thus the sprocket is free to turn and drive the flight-chain 20, on which the flights 21 are mounted, so as to have movement in planes at right angles to each other. Each flight is provided with a rearwardly-extending heel 22, having a bearing-surface substantially at right angles to the front face of the flight. The frame of the conveyer is provided with bearing-plates 23 24, which follow the course of the flights from one sprocket-wheel to the other. The bearing-plate 23 is on the side of the frame carrying the trough 25, or the ascending side of the conveyer. It is in position to be engaged by the heels of the flights and holds the latter substantially at right angles to the trough. This bearing-plate 23 stops at the sprocket-wheel 15. On the opposite side of the frame there is a return-casing 26. The outer wall of this is the bearing-plate 24, which is so located as to engage the outer ends of the flights and turn them backwardly, so that they shall not occupy so much room. The casing also prevents interference with the flights on the side. It ends near the forward end of the conveyer. The bearing-plate 24 is turned outwardly near its ends, so as to permit the flights to assume the proper angle for their heels to engage a star sprocket-wheel 27, pivoted on the forward end of the conveyer-frame. This star-wheel is provided with teeth having faces approximately as long as the heels on the flights. The faces are so located that the flights will be advanced beyond a radial position, and will hence enter the material point foremost and with a gouging action instead of with a simple sweep action. This angle is further important, for the reason that a sort of pocket is formed between the flight and the chain which holds the material, the flight being so inclined as to direct the material inwardly instead of outwardly, as was likely to be the case with a radial flight. Thus the flights do not tend to push the material to be loaded out of their reach.

Upon the forward end of the primary conveyer a scoop-plate 28 is pivotally mounted. It extends in front of the conveyer in substantially the shape of a triangle. The plate extends back of its pivots, being substantially rectangular in its rear portion. By reason of its extension back of the pivots it will sustain the weight of the front end of the conveyer without tilting, but will lie flat on the floor. At the apex of its front end the scoop-plate is provided with a pyramidal projection or nose 29. The plate extends beyond the ends of the flights in all positions of the latter, and thus provides a perfectly smooth floor for them to slide on. The plate is swung sidewise under the edge of the pile of material to be loaded, and the nose 29 loosens the material, causing it to fall onto the plate loosely and in proper condition to be moved by the flights. The scoop-plate on account of its shape is equally effective when moving either to right or left. Hence no time need be lost in swinging the conveyer back to the starting-point after having made a sweep across the room. As the material to be loaded settles down it is likely to spread some, and pieces will roll too far away to be collected by the scoop-plate. To bring such stray pieces into the path of or onto the scoop-plate, flaring side plates 30 31 are secured to the scoop-plate and extend laterally and rearwardly therefrom. Braces 32 33 support the side plates against flexure. As the scoop-plate advances the side plate upon the advance side will engage the stray material and force it into the path of the scoop-plate, which can then pick it up. The lower edges of the side plates are preferably in the plane of the scoop-plate.

Figure 6:
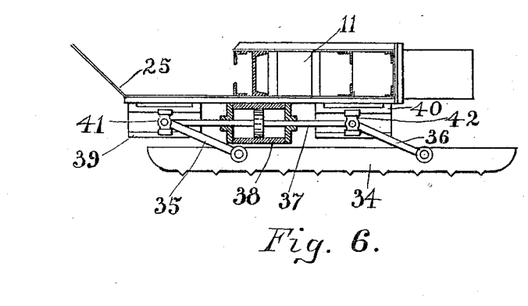
Fig. 6 is a transverse section through the forward end of the initial conveyer or gathering mechanism, showing details of the pneumatic feed mechanism.

The gathering mechanism has its sweep movement imparted to it by feed mechanism mounted upon the primary conveyer near its forward end. It consists of a creeper-bar 34, connected by links 35 36 to the piston-rod 37 of a fluid-pressure motor 38, the cylinder of which is secured to the frame of the conveyer. Slideways 39 40 are mounted upon opposite sides of the cylinder, and guide cross-heads 41 42 secured to the opposite ends of the piston-rod 37, which projects from both ends of the cylinder. The links 35 36 are pivoted on the cross-heads 41 42 in such manner as to permit them to describe substantially a semicircle. Hence the mechanism is reversible and will feed the gathering mechanism in either direction. The creeper-bar 34 is provided with teeth on its lower side to engage the floor. When the motive fluid is admitted to the cylinder on the side of the piston to exert a push upon the links, the creeper-bar will have its teeth forced into the floor to such an extent as to make it immovable. Hence the cylinder and the front end of the conveyer must move, and the desired feeding movement will be accomplished. On the other hand, when the motive fluid is admitted to the cylinder on the side of the piston to exert a pull upon the links the creeper-bar will be pulled upwardly, as well as longitudinally, its engagement with the floor will be very light, and it will be drawn to a new position, the front end of the conveyer remaining stationary. Then the admission of the motive fluid being reversed a second feeding movement of the conveyer will result. Thus the gathering mechanism is given a step-by-step movement. The fluid-pressure motor may be of any type; but a compressed-air motor is preferred because of its safety and convenience in mines.

Figure 7:
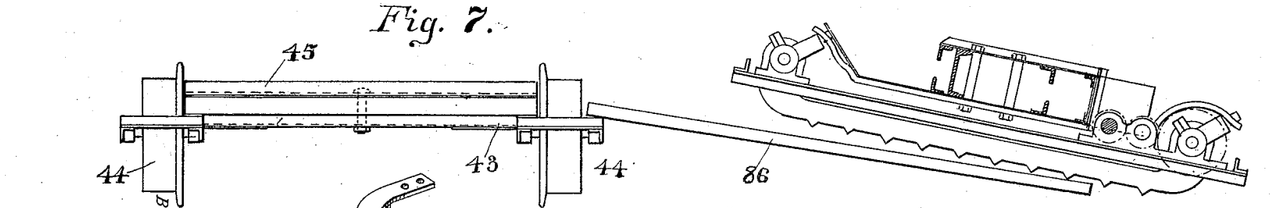
Fig. 7 is a front view of the pony-truck, showing the gathering mechanism starting up the incline.

A pony-truck is provided to support the front end of the gathering mechanism when the machine is to move from one room of a mine to another or from one pile of material to be loaded to another. The truck consists of a frame 43, mounted upon wheels 44. A platform 45 is pivoted on the frame, thus forming a turn-table. The platform is suitably shaped to support the feed mechanism on the front end of the gathering mechanism. The manner of loading the gathering mechanism on the pony-truck is indicated in Fig. 7. An incline or skid 86 extends from the truck to the ground in line with the creepers. In this figure there is shown a creeper-feed, such as is described and claimed in my copending application, filed May 16, 1904, Serial No. 208,180, as the pony-truck is equally applicable to a machine having such a feed mechanism. The creepers will then walk up and down the incline and onto the turn-table just as they walk along the ground. The front end of the gathering mechanism being mounted on the turn-table, the machine is ready to move under its own power. Although the gathering mechanism is long, the sharp curves can be rounded, for it is, in effect, pivoted at both ends upon separate trucks.

Figure 8:
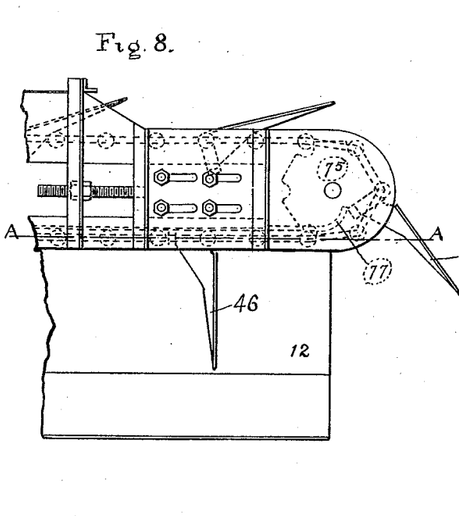
Fig. 8 is a top view of the picking-table.
Figure 9:
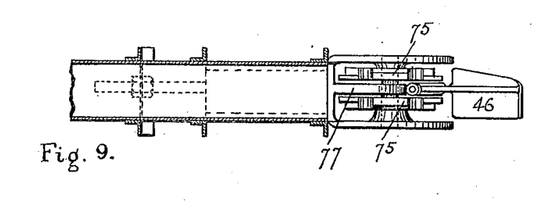
Fig. 9 is an irregular longitudinal section through the picking-table.

The picking-table 12 comprises a frame and troughs in which an endless sprocket-chain carrying flights 46 moves. The forward end of the picking-table is provided with trunnions 47 48, which are journaled in bearings 49 50 on a segmental bearing-plate 51. The bracket 10 and a second bracket 52ª, also mounted on the truck-frame, are provided with seats for the bearing-plate 51. The circular portions of the bearing-plate's periphery and the seats therefor are concentric with the head-shaft 9. Thus the bearing-plate 51 and the picking-table may have a limited lateral movement in a horizontal plane about the head-shaft 9. The mounting of the picking-table upon trunnions permits its vertical oscillation. The center line of the trunnions 47 48 preferably passes through the center of the head-shaft. To permit actuation of the flight-chain in all positions of the picking-table, a sprocket 69 is universally mounted on the head-shaft 9. The head-shaft 9 is provided with oppositely-extending pins 70 71, upon which is pivoted a frame 72, surrounding the head-shaft. The frame is provided with bearings at right angles to the bearings, through which pins 70 71 pass. The sprocket has an open center and surrounds the frame 72. Pins 73 74 extend inwardly from the sprocket and are journaled in the bearings on the frame. The flight-chain passes around the sprocket 69 at the front end of the picking-table and two sprockets 75 at the rear end thereof. The notches 76 of the sprocket 69, into which the chain-rivets carrying the flights 46 fall, are provided with inclined faces and tilt the flights forward with respect to the radial position. A guide-plate 77 extends from the sprocket 69 to the sprockets 75. The heels of the flights bear on this guide-plate, and they are thereby held at right angles to the trough of the conveyer. Near the sprockets 75 the guide-plate curves rapidly inward. This permits the flights to tilt rearward with respect to the radial position. When the flight moves out of contact with the guide-plate at its free end, the heel thereof is no longer confined, the space between the sprockets 75 being open. Hence the flight may fold back as far as the casing will allow and exerts no pushing force. The flights return through a narrow casing 78, the outer wall of which folds them back. The sprocket 69 has a lateral annular extension 79 on both sides of the plane of its teeth. These cylindrical portions are provided with peripheral grooves in which portions of the conveyer-frame are journaled. As shown in Figs. 8 and 9, the conveyer-frame has a casting 80, which is bifurcated in front and has semicircular notches in the bifurcations. These bifurcations engage the grooves on one side of the cylindrical portions of the sprocket. On the opposite side two parts 81 82, L-shaped in cross-section, are provided. These embrace the sprocket and are bolted to the casting 80. Thus the sprocket will move with the conveyer-frame in its oscillations and is yet free to rotate to drive the conveyer-chain. The picking-table is located with its forward end projecting beneath the rear or delivery end of the initial conveyer. The material carried up by the primary conveyer is discharged upon the final conveyer and by it discharged into the mine car or receptacle to be filled.

Figure 10:
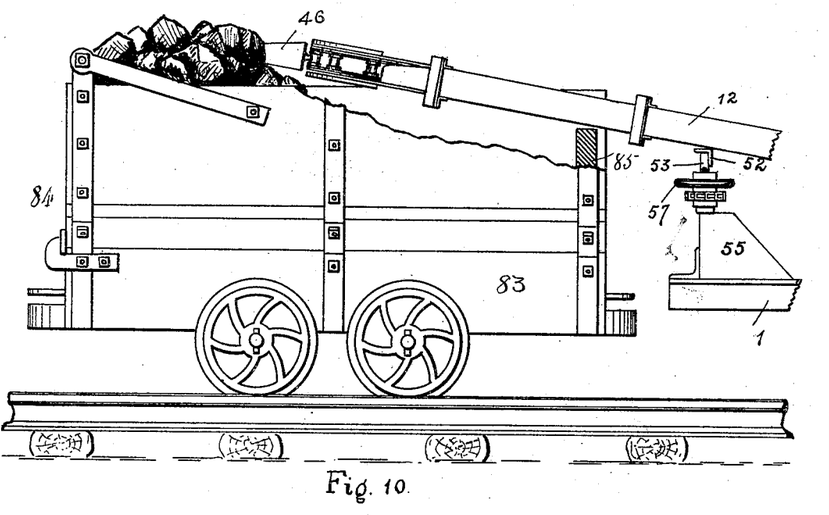
Fig. 10 is a side view, and Fig. 11 a top view, of a car and part of the loading-machine, illustrating the manner in which the car is pushed back as it is filled.
Figure 11:
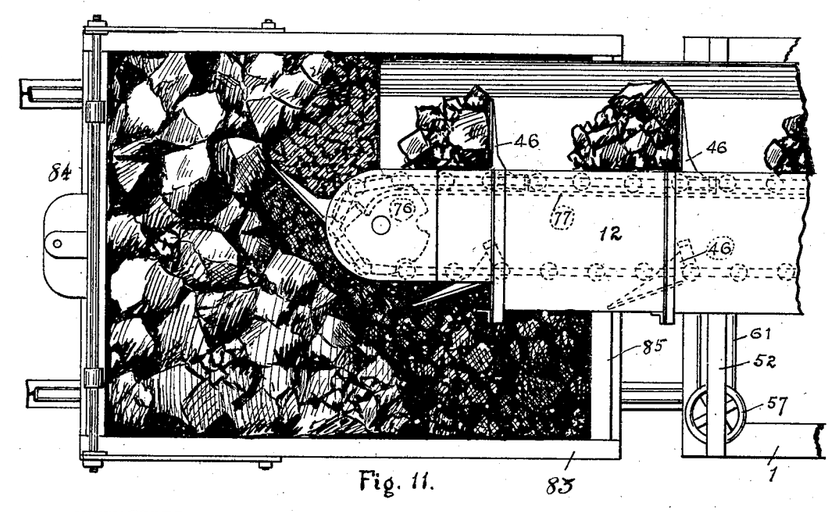
Figure 12:
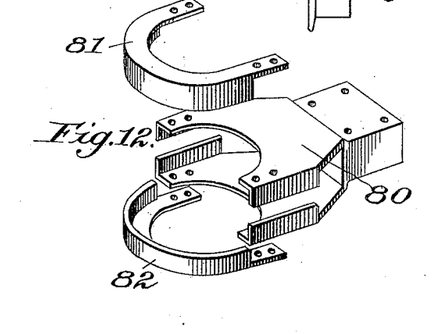
Fig. 12 is a perspective view of details of the bearing for the universally-mounted sprocket of the picking table.

The car 83 to be filled is so located that the picking-table will discharge into it near the end of the car farthest from the machine. The coal discharged falls freely until the heap reaches up to the end of the picking-table. After that time the flights will push the coal back and level the portion of the heap immediately under their path until the car is filled up to the top of the end-gate 84. Then the push exerted by the flights on the coal as it is discharged will be transmitted through the pile to the end-gate and the whole car will be moved backward away from the machine. This action will continue. The car will gradually move forward until it is filled to the rear end-gate 85. The movement given to the flights at the rear end of the picking-table described above contribute to the effectiveness of the flights in pushing the coal and the car forward.

Figure 1:
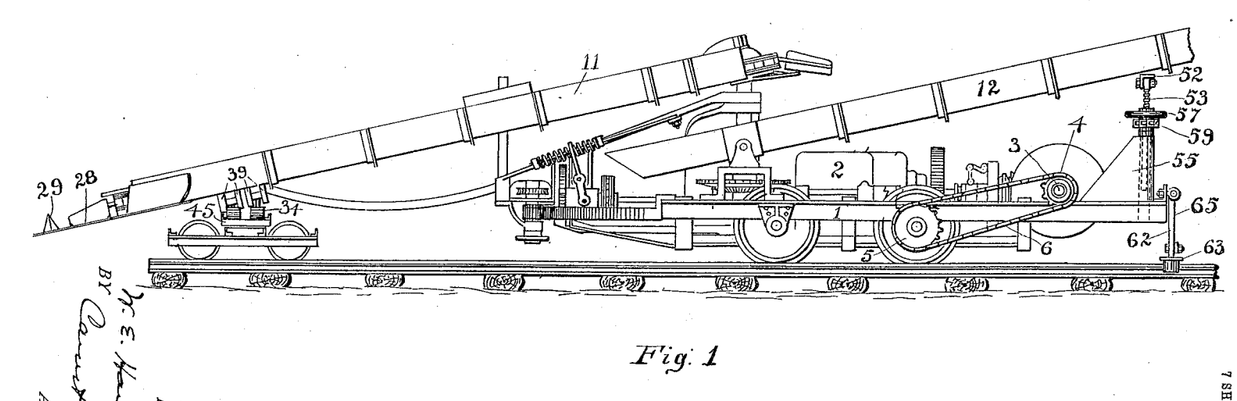
Figure 1 is a side elevation of my improved loading-machine ready to move from one place to another, the initial conveyer or gathering mechanism being mounted at its forward end upon the pony-truck.
Figure 2:
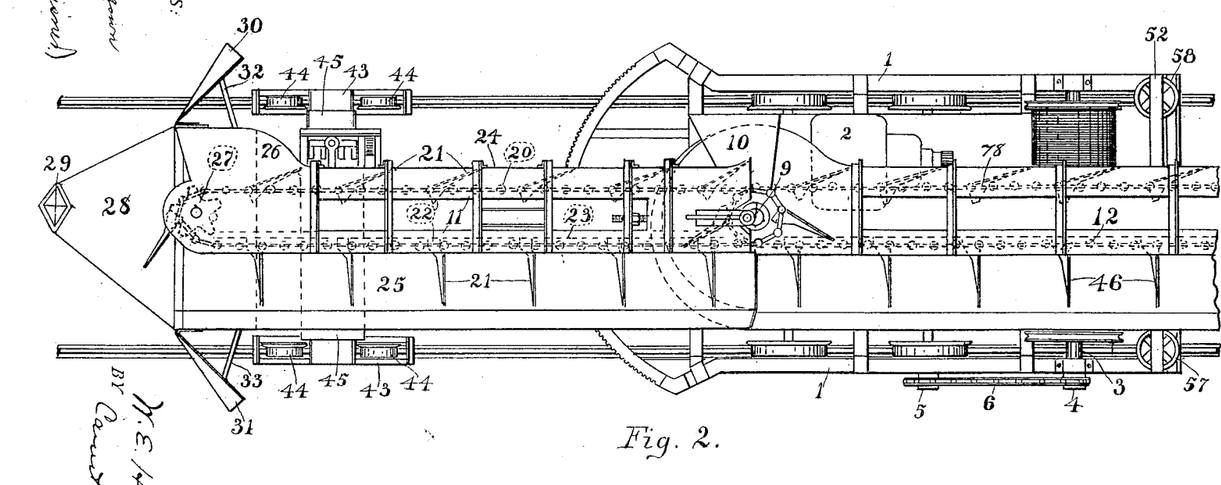
Fig. 2 is a top view of the parts shown in Fig. 1.
Figure 3:
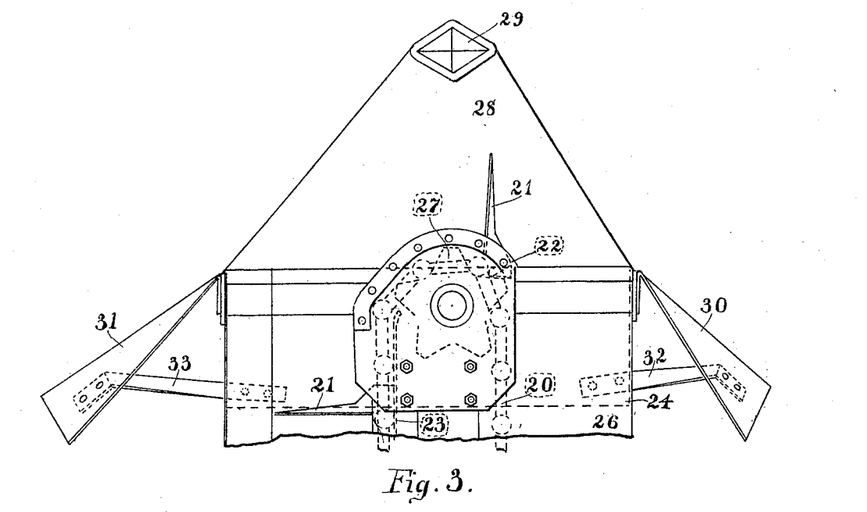
Fig. 3 is a plan view of the forward end of the initial conveyer or gathering mechanism on an enlarged scale.
Figure 4:
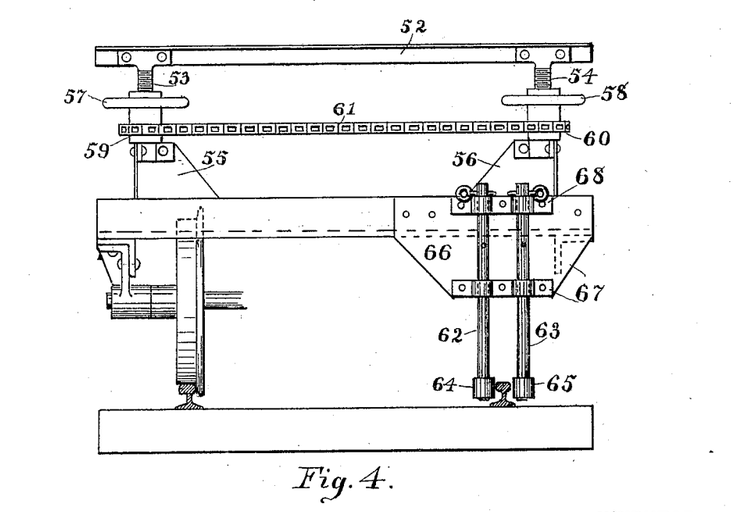
Fig. 4 is a rear view of the truck with the adjustable picking-table support and movable truck-stay mounted thereon.
Figure 5:
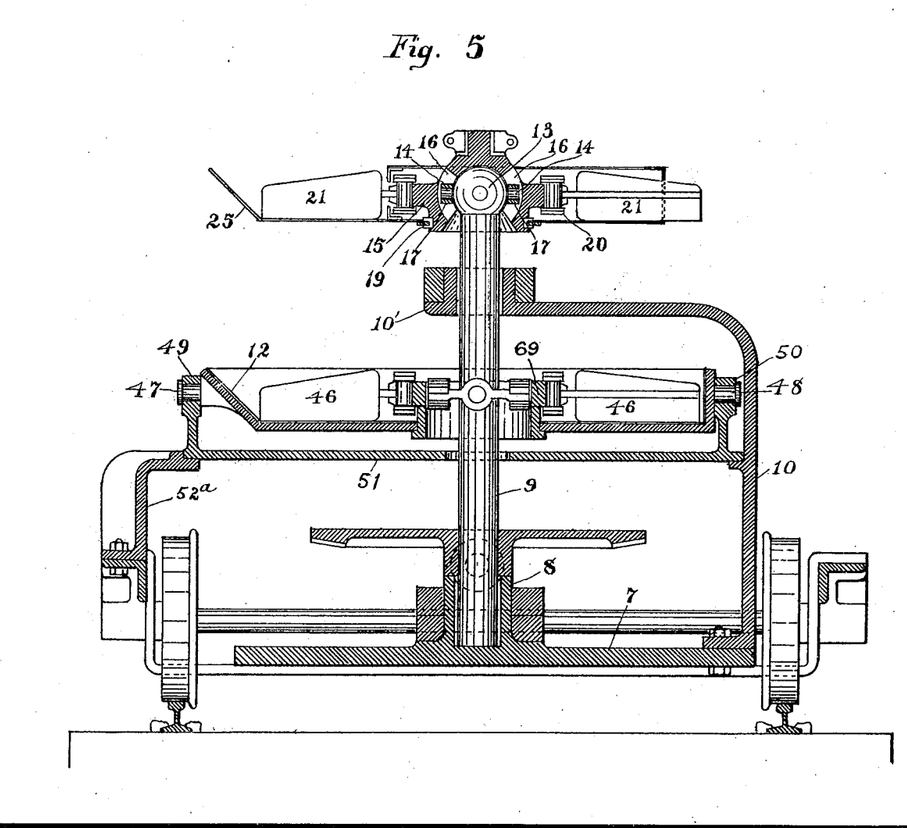
Fig. 5 is a vertical sectional view transverse to the truck through the bearings of the two conveyers on the head-shaft and adjacent parts.

The picking-table is supported intermediate of its ends by an adjustable support. The cars to be loaded may vary in height, and it is hence desirable to raise or lower the rear end of the picking-table which discharges into them. A supporting-bar 52 has screws 53 54 rigidly attached to it near its ends. The screws extend downwardly into socket-brackets 55 56. Hand-wheels 57 58, provided with integral sprocket-wheels 59 60, rest upon the tops of the brackets and have screw-threaded engagement with the screws. The sprocket-wheels are connected by a sprocket-chain 61. Thus by means of either hand-wheel both hand-wheels can be turned and the supporting-bar can be raised or lowered.

The reaction of the movement of the gathering mechanism about its pivot comes in part upon the truck and tends to slue it around. To resist this sluing force, two movable stays engaging a rail of the track are provided. These consist of two bars, which are free to move up and down in the straps 67 and 68, holding the same to the plate 66. At the lower extremities of the bars 62 and 63 rollers 64 and 65 are provided to bear against opposite sides of the rail. These two bars prevent the machine from sluing sidewise when the sweep is being operated. The rollers 64 and 65 will allow the machine to move forward and backward during its operation, and at times when the machine is to be moved some distance about the mine the bars 62 and 63 are slid up through the straps 67 and 68, where they are held by pins or other suitable means entirely out of engagement with the rails.

Obviously the machine is capable of considerable of modification within the scope of my invention, and therefore I do not wish to be limited to the specific construction shown and described.

What I claim as my invention, and desire to secure by Letters Patent, is—

1. A loading-machine comprising a conveyer arranged to have sweep movement about a vertical axis, a gathering-plate pivotally mounted upon the end of said conveyer and fluid-pressure feed mechanism mounted on said conveyer near its end and having engagement with the floor.

2. A loading-machine comprising a conveyer arranged to have movement about both horizontal and vertical axes, a gathering-plate pivotally mounted upon the end of said conveyer and having gathering edges upon its opposite sides, and reversible fluid-pressure feed mechanism mounted on said conveyer near its end and having engagement with the floor.

3. A loading-machine comprising gathering mechanism arranged to have a sweep movement about a vertical axis, and fluid-pressure feed mechanism mounted on said gathering mechanism near its end and having engagement with the floor.

4. A loading-machine comprising gathering mechanism arranged to have sweep movement in either direction about a vertical axis, and reversible fluid-pressure feed mechanism mounted on said gathering mechanism near its end and having engagement with the floor.

5. A loading-machine comprising gathering mechanism arranged to have sweep movement about a vertical axis, a fluid-pressure feed mechanism mounted near the end of said gathering mechanism and having a toothed creeper in contact with the floor.

6. A loading-machine comprising gathering mechanism arranged to have sweep movement about a vertical axis, a cylinder mounted on said gathering mechanism near its end and provided with a piston and piston-rod, and a toothed creeper pivotally connected to said piston-rod and arranged to engage the floor.

7. A loading-machine comprising gathering mechanism arranged to have sweep movement about a vertical axis, a cylinder mounted on said gathering mechanism near its end and provided with a piston and a piston-rod projecting through both ends of the cylinder, and a toothed bar pivotally connected at its ends to the opposite ends of said piston-rod and arranged to engage the floor.

8. A loading-machine comprising a conveyer arranged to have a sweep movement about a vertical axis and a gathering-plate mounted on the end of said conveyer and arranged to gather material from the ground when moving in either direction.

9. A loading-machine comprising a conveyer arranged to have a sweep movement about a vertical axis, a gathering-plate projecting from the end of said conveyer and arranged to be forced under the material to be loaded and gather the material from the ground when moving in either direction, and symmetrical means on said gathering-plate to loosen the material when moving in either direction.

10. A loading-machine comprising a conveyer arranged to have a sweep movement in either direction about a vertical axis, a gathering-plate projecting from the end of said conveyer and arranged to be forced under the material to be loaded from either direction and means on said gathering-plate to loosen the material.

11. A loading-machine comprising a conveyer arranged to have a sweep movement in either direction about a vertical axis, a gathering-plate projecting from the end of said conveyer and having forwardly-converging gathering edges, and means at the forward end of said plate to loosen the material to be loaded.

12. A loading-machine comprising a conveyer arranged to have a sweep movement about a vertical axis, a gathering-plate pivoted upon the end of said conveyer and having forwardly-converging gathering edges and a projection upon the forward end of said gathering-plate.

13. A loading-machine comprising a conveyer arranged to have sweep movement about a substantially vertical axis, a gathering-plate projecting from the end of said conveyer and having a gathering edge, and a member projecting from said gathering-plate to move material that is out of the path of said gathering edge into said path.

14. A loading-machine comprising a conveyer, a gathering-plate projecting from the forward end of said conveyer and having a gathering edge, and a member projecting laterally and rearwardly from said gathering-plate to move material into the path of said gathering edge.

15. A loading-machine comprising a conveyer, a gathering-plate projecting from the forward end of said conveyer and having a gathering edge, and a plate projecting laterally and rearwardly from said gathering-plate and having its lower edge in substantially the plane of said plate.

16. A loading-machine comprising a head-shaft, a conveyer mounted on said head-shaft to have universal movement and actuated by said head-shaft, and a secondary conveyer arranged to be actuated by said head-shaft and to receive the material discharged from said first-mentioned conveyer, said secondary conveyer being provided with trunnions near one end, and a bearing-plate mounted to turn about said head-shaft in bearings concentric therewith and provided with bearings for said trunnions.

17. A loading-machine comprising gathering mechanism having an endless conveyer the going and return sections of which are in substantially the same horizontal plane, a final conveyer having its going and return sections in substantially the same horizontal plane arranged to receive the material discharged from said gathering mechanism, and a head-shaft to actuate both said conveyers, said conveyers being mounted to have universal movement about said head-shaft.

18. A loading-machine comprising vertically-alined bearings, a shaft journaled in said bearings, a sprocket mounted on said shaft by means of a universal joint, a conveyer actuated by said sprocket and having trunnions at right angles to said shaft, and a bearing-plate resting in bearings concentric with said shaft and provided with bearings for said trunnions.

19. A loading-machine comprising a truck, a conveyer pivotally mounted on said truck, sockets mounted on said truck rearwardly of the pivot-point of said conveyer, screws extending into said sockets and provided with sprockets, a sprocket-chain connecting said sprockets, and a support for said conveyer rigidly connected to said screws.

20. A loading-machine comprising a truck, a conveyer pivotally mounted on said truck, actuating mechanism for said conveyer mounted on said truck, independently vertically movable stays on said truck and rollers on said stays, respectively, in position to engage opposite sides of a track-rail.

21. A loading-machine comprising a truck, a conveyer pivotally mounted at one end on said truck, a creeper feed mechanism on said conveyer near its forward end, and a pony-truck having a pivoted table to support said creeper feed mechanism.

22. A loading-machine comprising a head-shaft, a conveyer mounted to have universal movement about said shaft and provided with a chain, transverse journals on said head-shaft, a frame mounted on said journals, and provided with bearings at right angles to said journals, and a sprocket provided with journals to engage said bearings and driving said chain.

23. In a loading-machine, a conveyer comprising a frame having a trough on the load-carrying side, sprockets journaled in the opposite ends of said frame, a sprocket-chain connecting said sprockets, flights on said chain provided with bearing projections, and a fixed guide extending from sprocket to sprocket on the load-carrying side of said frame curving rapidly inward near the rear end of the conveyer and arranged to be engaged by the bearing projections of said flights whereby said flights are held perpendicular to the longitudinal axis of said trough during their movement therealong and are permitted to incline with respect to the radial position in passing around the rear sprocket but held in an operative position.

24. In a loading-machine a conveyer comprising a trough, an endless chain, flights pivotally mounted on said chain and extending into said trough and a guide to hold said flights in operative positions, said guide extending beyond said trough at the discharge end of said conveyer whereby said flights may act upon the material being loaded after it has passed from said trough.

25. The combination of a car having an end-gate, and a loading-machine comprising a conveyer having a trough, an endless chain and flights on said chain and projecting into said trough, the discharge end of said conveyer projecting into said car and being located at an elevation not higher than the top of said end-gate, whereby as said car is filled it may be moved with respect to said conveyer by the action of said flights on the material between said flights and said end-gate.

26. The combination of a car having a front end-gate and a loading-machine comprising a truck, a conveyer pivotally mounted on said truck and having a trough, an endless chain and flights on said chain projecting into said trough, the end of said conveyer projecting into said car, and a support on said truck for said conveyer to hold the end thereof at an elevation not higher than the top of said end-gate, whereby as said car is filled it may be moved with respect to said conveyer by the action of said flights on the material between said flights and said end-gate.

In testimony whereof I have signed my name to this specification, in the presence of two subscribing witnesses, this 29th day of August, 1904.

WILLIAM E. HAMILTON.

Witnesses:
 FRED F. REISNER,
 J. B. MEGOWN.